US009584586B2

(12) United States Patent
Kato

(10) Patent No.: US 9,584,586 B2
(45) Date of Patent: Feb. 28, 2017

(54) INFORMATION PROCESSING APPARATUS, INFORMATION PROCESSING METHOD, STORAGE MEDIUM, AND PROGRAM

(71) Applicant: Sony Corporation, Tokyo (JP)

(72) Inventor: Yoshikazu Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 204 days.

(21) Appl. No.: 14/267,561

(22) Filed: May 1, 2014

(65) Prior Publication Data
US 2014/0244731 A1 Aug. 28, 2014

Related U.S. Application Data

(60) Division of application No. 14/154,920, filed on Jan. 14, 2014, now abandoned, which is a continuation of
(Continued)

(30) Foreign Application Priority Data

Sep. 26, 2002 (JP) .................................. 2002-280258

(51) Int. Cl.
H04L 29/08 (2006.01)
G06Q 30/02 (2012.01)
(Continued)

(52) U.S. Cl.
CPC ............... H04L 67/06 (2013.01); G06F 17/21 (2013.01); G06F 17/301 (2013.01);
(Continued)

(58) Field of Classification Search
CPC ...................................................... H04L 67/06
See application file for complete search history.

(56) References Cited

U.S. PATENT DOCUMENTS 5,754,939 A 5/1998 Herz et al.
6,338,051 B1 * 1/2002 Kang ..................... G06Q 30/02
706/11
(Continued)

FOREIGN PATENT DOCUMENTS

JP 2000-112963 4/2000
JP 2001-155023 6/2001

OTHER PUBLICATIONS

Muller, "Desktop Encyclopedia of the Internet", 1999, Artech House Inc., Norwood, MA, all pages.
(Continued)

Primary Examiner — Jacob C. Coppola
(74) Attorney, Agent, or Firm — Oblon, McClelland, Maier & Neustadt, L.L.P.

(57) ABSTRACT

An information processing apparatus is disclosed which includes: a storing element for storing content data; a managing element for managing preference data by which to determine preferences of a user; a reading element for reading the content data from the storing element in response to an instruction from the user; a sorting element for sorting the content data read by the reading element, in accordance with the preference data managed by the managing element; and a composing element for composing the content data sorted by the sorting element, into a single item ready to be handled by the user.

15 Claims, 14 Drawing Sheets

Related U.S. Application Data application No. 10/656,274, filed on Sep. 8, 2003, now Pat. No. 8,706,512.

(51) Int. Cl.

| | | |
|---|---|---|
| *G06Q 30/06* | (2012.01) | |
| *G06F 17/30* | (2006.01) | |
| *G06F 17/21* | (2006.01) | |
| *H04L 29/06* | (2006.01) | |

(52) U.S. Cl.
CPC ... *G06F 17/30011* (2013.01); *G06Q 30/0235* (2013.01); *G06Q 30/06* (2013.01); *H04L 67/306* (2013.01); *H04L 67/42* (2013.01)

(56) References Cited

U.S. PATENT DOCUMENTS

| | | | |
|---|---|---|---|
| 6,662,231 B1 * | 12/2003 | Drosset | G06F 17/30017 707/E17.009 |
| 6,788,768 B1 | 9/2004 | Saylor et al. | |
| 7,257,598 B2 | 8/2007 | Toivonen et al. | |
| 2001/0032258 A1 | 10/2001 | Ishida et al. | |
| 2001/0051983 A1 | 12/2001 | Williams | |
| 2002/0010759 A1 | 1/2002 | Hitson et al. | |
| 2002/0040374 A1 | 4/2002 | Kent | |
| 2002/0053076 A1 | 5/2002 | Landesmann | |
| 2002/0065730 A1 | 5/2002 | Nii | |
| 2002/0143655 A1 | 10/2002 | Elston et al. | |
| 2003/0144961 A1 | 7/2003 | Tharaken et al. | |

OTHER PUBLICATIONS

Gralla, "How the Internet Works", Millennium Edition, 1999, Que Corporation, Indianapolis, IN, all pages.

White, "How Computers Word", Millennium Edition, 1999, Que Corporation, Indianapolis, IN, all pages.

Dealer, "How Networks Work", Bestseller Edition, 1996, Ziff-Davis press, Emeryville, CA, all pages.

\* cited by examiner

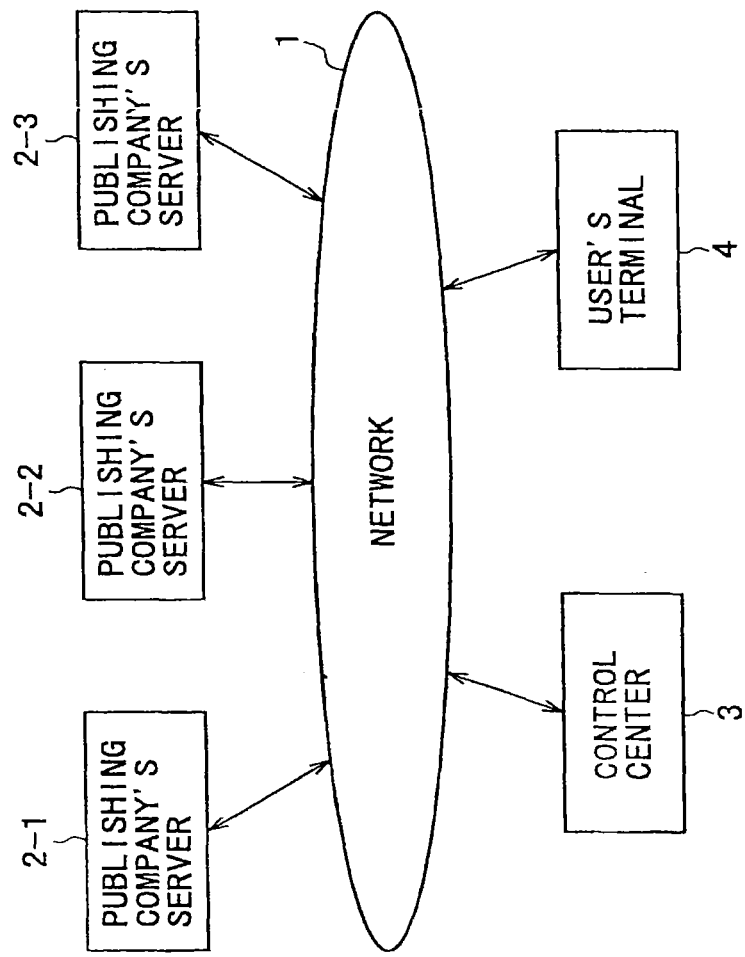

F I G. 7
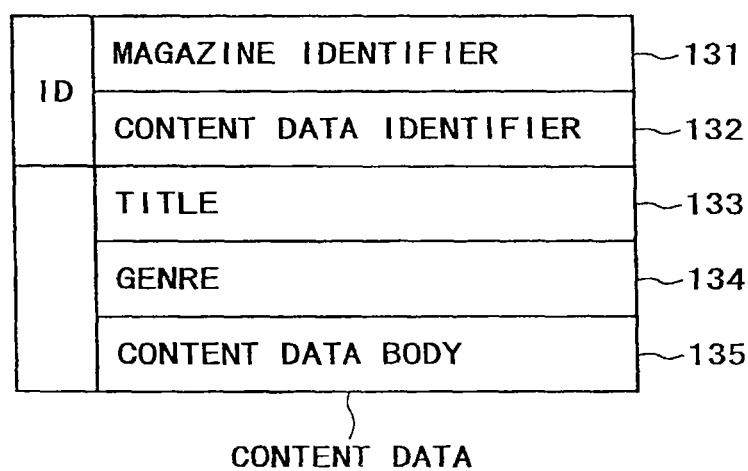
CONTENT DATA

FIG. 9

| USER NAME | GENRES | | | | | |
|---|---|---|---|---|---|---|
| | POLITICS | ECONOMY | SOCIETY | SPORTS | ENTERTAINMENT | ......... |
| A | 5 | 3 | 1 | 0 | 0 | |
| B | 1 | 1 | 0 | 6 | 15 | |
| C | 2 | 3 | 10 | 11 | 18 | |
| ---------- | | | | | | |

111

F I G. 1 0
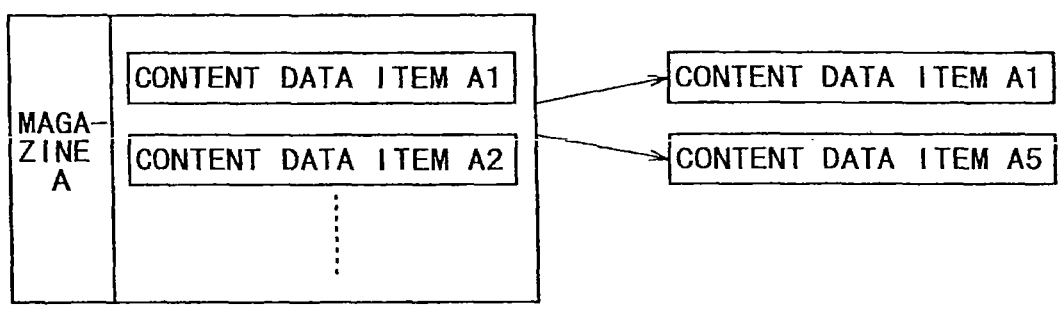
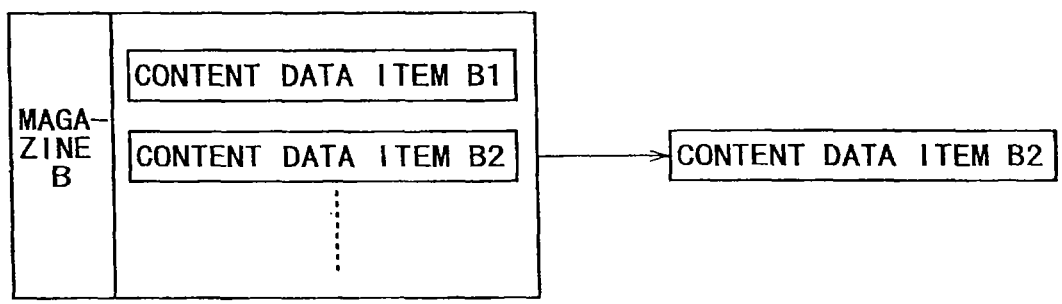
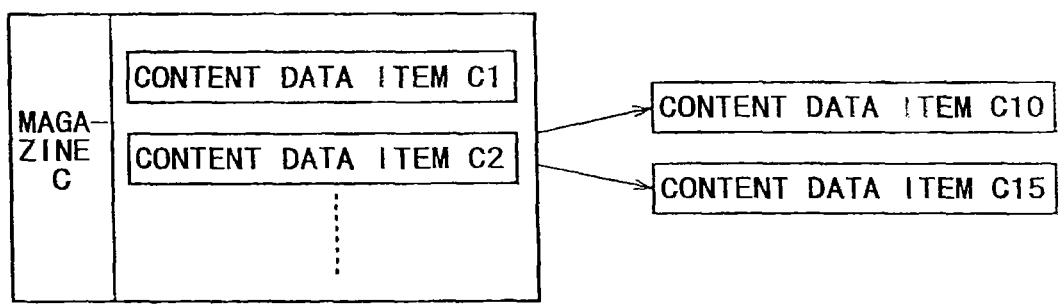

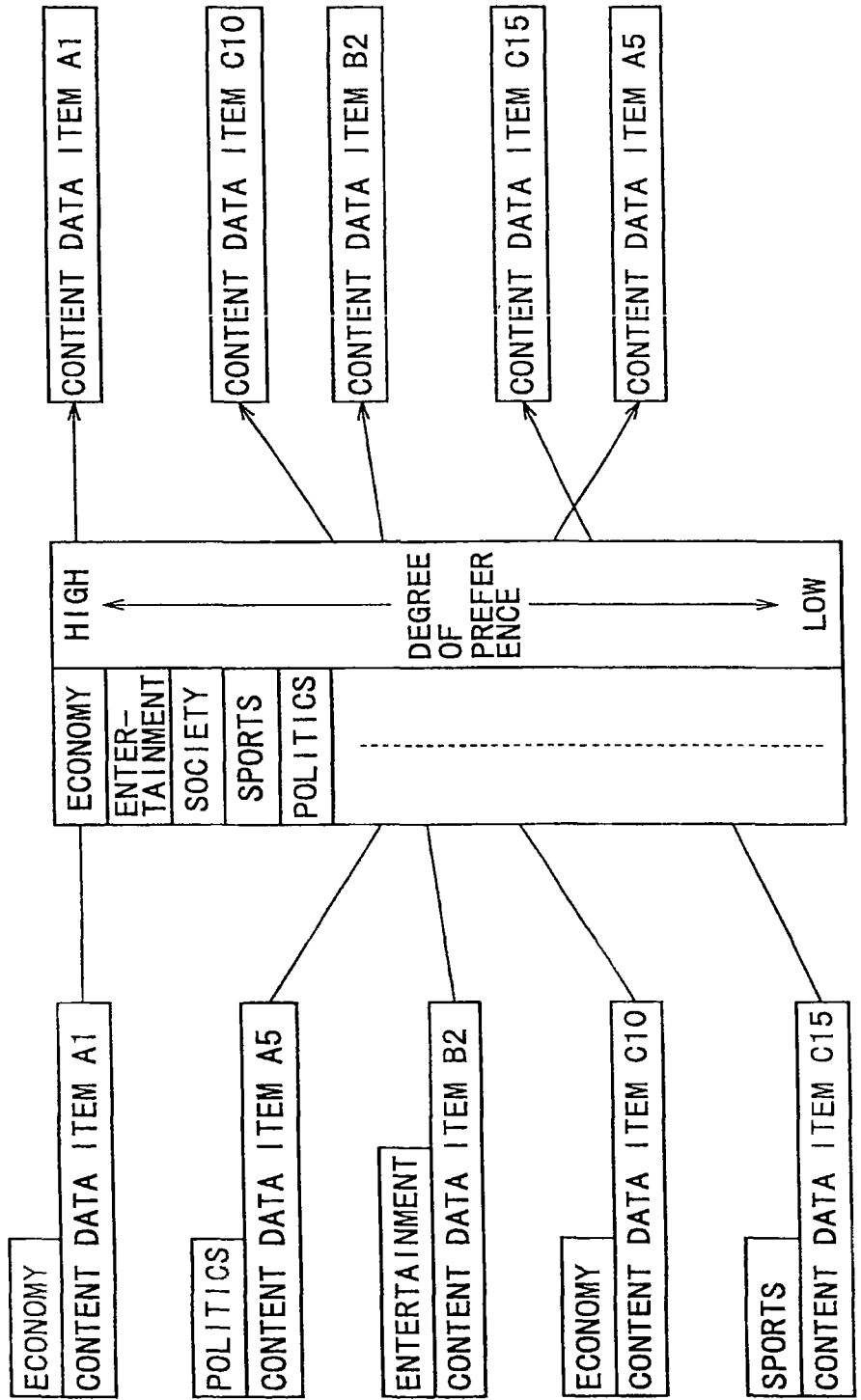

F I G. 1 2
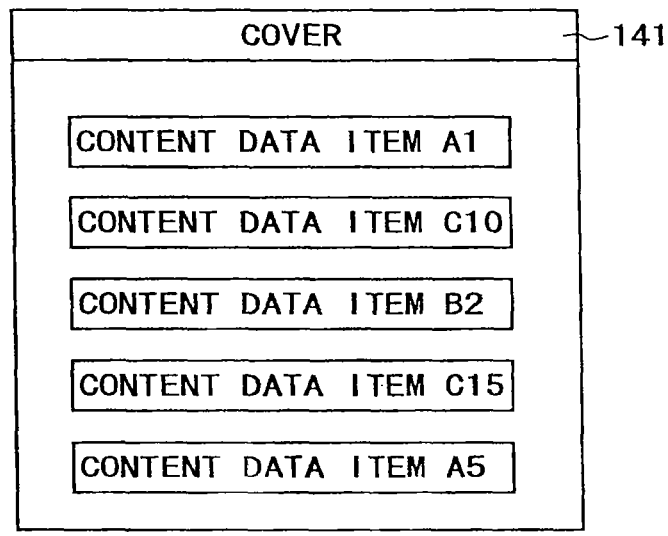

INFORMATION PROCESSING APPARATUS, INFORMATION PROCESSING METHOD, STORAGE MEDIUM, AND PROGRAM

CROSS-REFERENCE TO RELATED APPLICATIONS

This application is a divisional of U.S. application Ser. No. 14/154,920, filed Jan. 14, 2014, which is a continuation of U.S. application Ser. No. 10/656,274, filed Sep. 8, 2003, now U.S. Pat. No. 8,706,512, the entire content of which is incorporated herein by reference, and which claims the benefit of priority from Japanese Patent Application No. 2002-280258, filed with the Japanese Patent Office on Sep. 26, 2002.

BACKGROUND OF THE INVENTION

The present invention relates to an information processing apparatus, an information processing method, a storage medium, and a program. More particularly, the invention relates to an information processing apparatus, an information processing method, a storage medium, and a program for use with equipment that handles electronic books.

Electronic books composed of text data are coming into general use today. Traditional paper books with printed text information are getting taken over in part by their electronic counterparts whose text data are displayed on an electronic book display terminal in a double-page spread format. Operating on a suitable button of the terminal feeds text images one page at a time and gives readers the impression that a paper book is spread out before their eyes and its pages are being turned.

The places where electronic books can be bought are not limited to bookstores. It has been proposed that electronic books be marketed and purchased in the form of data over a network such as the Internet. One such proposal is disclosed in Japanese patent Laid-open No. 2002-245265 (on pages 3 and 4 in particular).

Purchasing an electronic book over the network is convenient especially when one can do so at home or from other appropriate locations. This, however, entails some inconveniences. Electronic books aside, a user may wish to read an article "a" from a magazine A and an article "b" from a magazine B. In that case, the user must purchase the whole magazines A and B including all unwanted articles and stories (i.e., those other than the articles "a" and "b").

That wholesale purchase required of users (readers) is unduly expensive from their point of view. The unwanted expenditures are likely to dampen the readers' willingness to purchase more books or magazines, which often results in poor business for publishers.

In electronic books and magazines alike, articles or stories may or may not be arranged in the sequence preferred by a given user. That is because the sequence of articles and stories is fixed when a magazine composed thereof has been edited and finished for publication; users' preferences are almost never reflected in the sequence of these articles or stories. In reading electronic magazines, the reader is required to turn all intervening pages to arrive at each of the desired articles, which can be a bothersome chore. The inconvenience is all the more pronounced if there are more articles involved with many more pages; the user must wade through the bewildering arrays of articles before reaching a preferred story.

SUMMARY OF THE INVENTION

The present invention has been made in view of the above circumstances and provides an information processing apparatus, an information processing method, a storage medium, and a program whereby the articles desired by a user are arranged in the sequence preferred by that user in an electronic book display environment.

In carrying out the invention and according to one aspect thereof, there is provided an information processing apparatus including: a storing element for storing content data; a managing element for managing preference data by which to determine preferences of a user; a reading element for reading the content data from the storing element in response to an instruction from the user; a sorting element for sorting the content data read by the reading element, in accordance with the preference data managed by the managing element; and a composing element for composing the content data sorted by the sorting element, into a single item ready to be handled by the user.

In a preferred structure according to the invention, the managing element may determine a genre of the content data read by the reading element and may associate the number of times content data belonging to the genre thus determined have been read, with information for identifying the user for management purposes.

In another preferred structure according to the invention, the content data in effect before being composed into the single item by the composing element may include at least information for distinguishing the content data from other content data and information for indicating where the content data are stored in the storing element.

According to another aspect of the invention, there is provided an information processing method including the steps of: controlling storage of content data; managing preference data by which to determine preferences of a user; reading the content data stored in the storage controlling step, in response to an instruction from the user; sorting the content data read in the reading step, in accordance with the preference data managed in the managing step; and composing the content data sorted in the sorting step, into a single item ready to be handled by the user.

According to a further aspect of the invention, there is provided a storage medium which stores a computer-readable program including the steps of: controlling storage of content data; managing preference data by which to determine preferences of a user; reading the content data stored in the storage controlling step, in response to an instruction from the user; sorting the content data read in the reading step, in accordance with the preference data managed in the managing step; and composing the content data sorted in the sorting step, into a single item ready to be handled by the user.

According to an even further aspect of the invention, there is provided a program for causing a computer to execute the steps of: controlling storage of content data; managing preference data by which to determine preferences of a user; reading the content data stored in the storage controlling step, in response to an instruction from the user; sorting the content data read in the reading step, in accordance with the preference data managed in the managing step; and composing the content data sorted in the sorting step, into a single item ready to be handled by the user.

Through the use of the information processing apparatus, information processing method, and program according to the invention, the content data read out in response to the user's instruction are sorted in keeping with the user's preferences before being offered to the user. A plurality of content data items to be offered are composed into a single item ready to be handled by the user.

Other objects, features and advantages of the present invention will become more apparent in the following specification and accompanying drawings.

BRIEF DESCRIPTION OF THE DRAWINGS

FIG. 1 is a schematic view showing a typical configuration of an information processing system according to the invention;

FIG. 7 is an explanatory view indicating a typical structure of content data to be transmitted;

FIG. 9 is an explanatory view of preference data;

FIG. 10 is an explanatory view showing how content data are selected;

FIG. 11 is an explanatory view sketching how content data are sorted;

FIG. 12 is an explanatory view depicting how content data are composed;

DETAILED DESCRIPTION OF THE PREFERRED EMBODIMENTS

Figure 2:
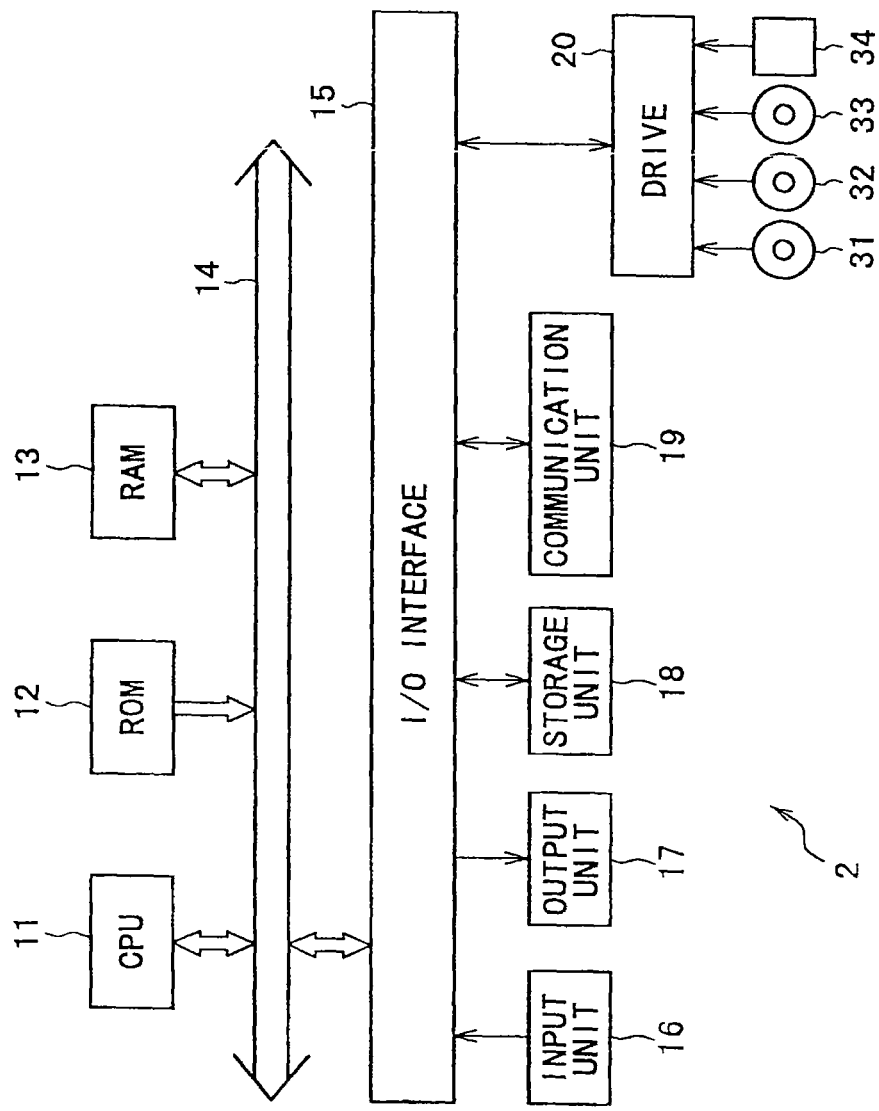
FIG. 2 is a block diagram depicting an internal structure of a publishing company's server.

Preferred embodiments of this invention will now be described with reference to the accompanying drawings. FIG. 1 is a schematic view showing a typical configuration of an information processing system comprising an information processing apparatus embodying the invention. The system in FIG. 1 is designed to handle electronic books composed of text data. An electronic book contains information that is generally recorded in printed form on its conventional counterpart in paper. Typically, the electronic book has its text data displayed on an electronic book display terminal (e.g., user terminal 4 in FIG. 1) in a double-page spread format.

A network 1 as part of the system is constituted by a wide area network such as the Internet or by a LAN (local area network). The network 1 is connected to a publishing companies' servers 2-1 through 2-3, a control center 3, and a user terminal 4. In the description that follows, the publishing companies' servers 2-1 through 2-3 will be simply referred to as the publishing company's server 2 if there is no specific need for distinguishing the individual servers from one another. Although the setup of FIG. 1 shows only three publishing companies' servers 2-1 through 2-3 for purpose of simplification, many more publishing companies' servers may be connected to the network 1 in practice. Likewise, not one but a plurality of user terminals 4 may be actually connected to the network 1.

The system in FIG. 1 does not include a billing server that charges users for the electronic books they bought and settles the payments they make, because such a server has no direct relevance to this invention. However, the billing server or the like can be included where necessary.

FIG. 2 sketches a typical internal structure of the publishing company's server 2 constituted illustratively by a computer. In the server 2, a CPU (central processing unit) 11 carries out diverse processes in accordance with programs held in a ROM (read only memory) 12. A RAM (random access memory) 13 retains data and programs that may be needed by the CPU 11 performing its processes.

An I/O interface 15 is connected to an input unit 16 made up of a keyboard and a mouse. A signal input to the input unit 16 is forwarded through the I/O interface 15 to the CPU 11. The I/O interface 15 is also connected to an output unit 17 composed of a display unit and speakers.

The I/O interface 15 is further connected to a storage unit 18 formed by a hard disc drive or the like and to a communication unit 19. The communication unit 19 exchanges data with other units (e.g., control center 3) over the network 1 such as the Internet. A drive 20 accommodating a storage medium such as a magnetic disc 31, an optical disc 32, a magneto-optical disc 33, or a semiconductor memory 34 writes and reads data to and from the accommodated medium.

The publishing company's server 2 transmits content data such as those of magazines to the control center 3 over the network 1. The content data coming from the publishing company's server 2 may be those derived digitally from the magazines published conventionally in paper by the publishing company running the server 2, as well as digital data created anew by the company specifically to constitute electronic books.

The storage unit 18 of the publishing company's server 2 holds content data that are transmitted from the communication unit 18. Alternatively, the content data retrieved from the storage unit 19 or newly created content data may be recorded to a storage medium loaded in the drive 20, the medium being subsequently shipped to the control center 3.

Figure 3:
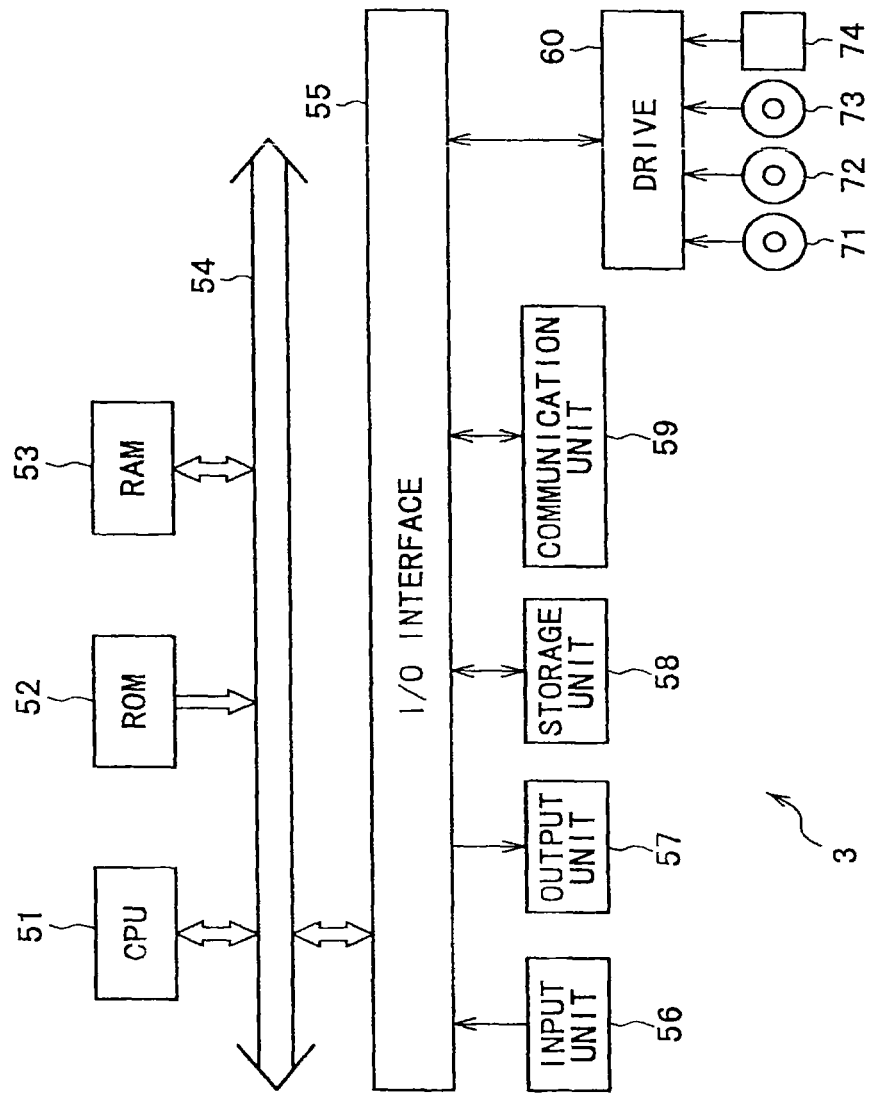
FIG. 3 is a block diagram illustrating an internal structure of a control center.

FIG. 3 shows a typical internal structure of the control center 3 constituted illustratively by a computer. In the control center 3, a CPU 51 carries out diverse processes in accordance with programs held in a ROM 52. A RAM 53 retains data and programs that may be needed by the CPU 51 for performing its processes.

An I/O interface 55 is connected to an input unit 56 made up of a keyboard and a mouse. A signal input to the input unit 56 is forwarded through the I/O interface 55 to the CPU 51. The I/O interface 55 is also connected to an output unit 57 composed of a display unit and speakers.

The I/O interface 55 is further connected to a storage unit 58 formed by a hard disc drive or the like and to a communication unit 59. The communication unit 59 exchanges data with other units (e.g., publishing company's server 2) over the network 1 such as the Internet. A drive 60 accommodating a storage medium such as a magnetic disc 71, an optical disc 72, a magneto-optical disc 73, or a semiconductor memory 74 writes and reads data to and from the accommodated medium.

The user terminal 4 may be a personal computer, a PDA (personal digital assistant), or a dedicated terminal that handles electronic books. The internal structure of the user terminal 4 may be basically the same as that of the control center 3 and thus will not be discussed further.

Figure 4:
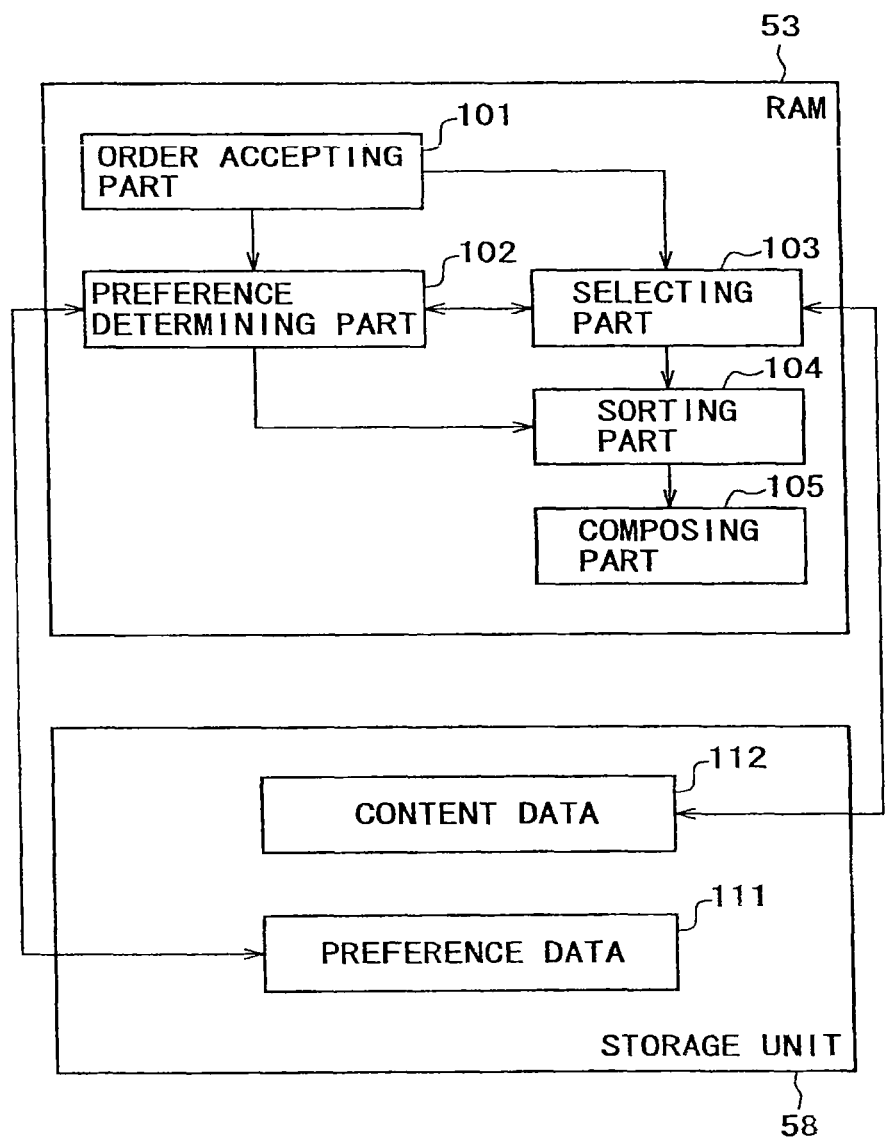
FIG. 4 is an explanatory view of data stored in a storage unit.

The RAM 53 in the control center 3 retains a program with functions such as those shown in FIG. 4. The storage unit 58 holds data such as those indicated in FIG. 4. An order accepting part 101 of the program accepts orders placed by users for the purchase of electronic books. Upon accepting an order, the order accepting part 101 forwards information about the order to a preference determining part 102 or a selecting part 103.

The information fed to the preference determining part 102 includes at least information for identifying the user who has placed the order (the information may be called the user information hereunder where appropriate). The information supplied to the selecting part 103 includes at least information for identifying the ordered electronic book (the information may be called the electronic book identification information hereunder where appropriate).

Where all users who wish to make use of this system need to register their information in advance, the user information about each user will include a password and a user ID assigned upon registration. If advance user registration is not necessary, then the user information may be formed by each user's name, address, and other related data. In any case, the user information need only be such as to identify uniquely each user who has placed an order.

The preference determining part 102 searches the storage unit 58 for preference data 111 based on the supplied user information, and retrieves the preferences of the user who has ordered the electronic book. The user's preferences thus read out are sent to a sorting part 104. On the other hand, the selecting part 103 searches the storage unit 58 for content data 112 based on the electronic book identification information received from the order accepting part 101. The content data making up the electronic book ordered by the user are then retrieved and fed to the sorting part 104.

The sorting part 104 receives the content data from the selecting part 103, sorts the received content data in accordance with the user's preferences fed from the preference determining part 102, and outputs the sorted data to a composing unit 105. The composing part 105 composes the multiple content data items that have been sorted, into a single electronic book to be offered to the user. The content data in the form of a single electronic book are transmitted from the communication unit 59 to the user terminal 4.

Figure 5:
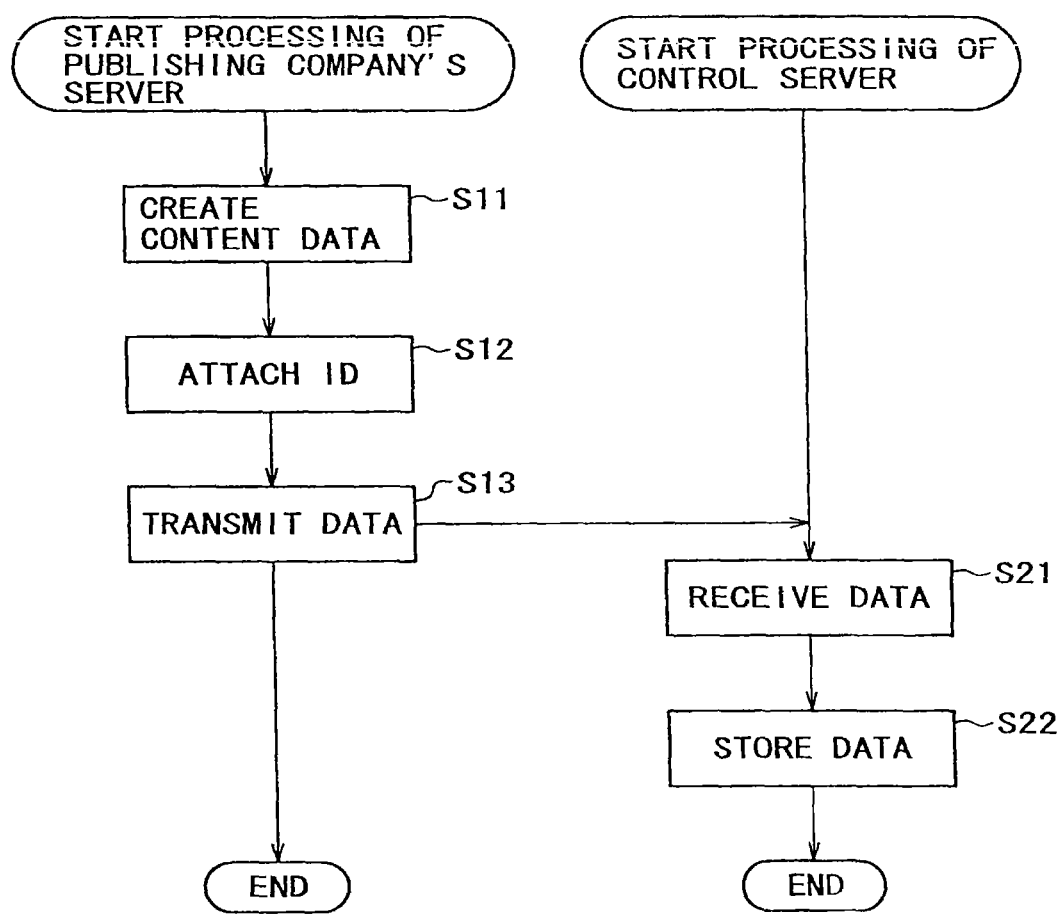
FIG. 5 is a flowchart of steps for storing content data.

Described below with reference to the flowchart of FIG. 5 is the processing carried out between the publishing company's server 2 and the control server 3. In step S11, the publishing company's server 2 creates content data which, in passing, are described below with reference to FIG. 6. It is assumed that the publishing company 2 publishes a number of magazines A through M (M=natural number). It is also assumed that the magazines include weeklies, monthlies, newspapers, and books. In other words, the magazines in this context are assumed to include all publications offered as electronic books composed of text and image data. The magazines deal with all categories of topics and themes: novels, cartoons, newspaper articles and many others.

Figure 6:
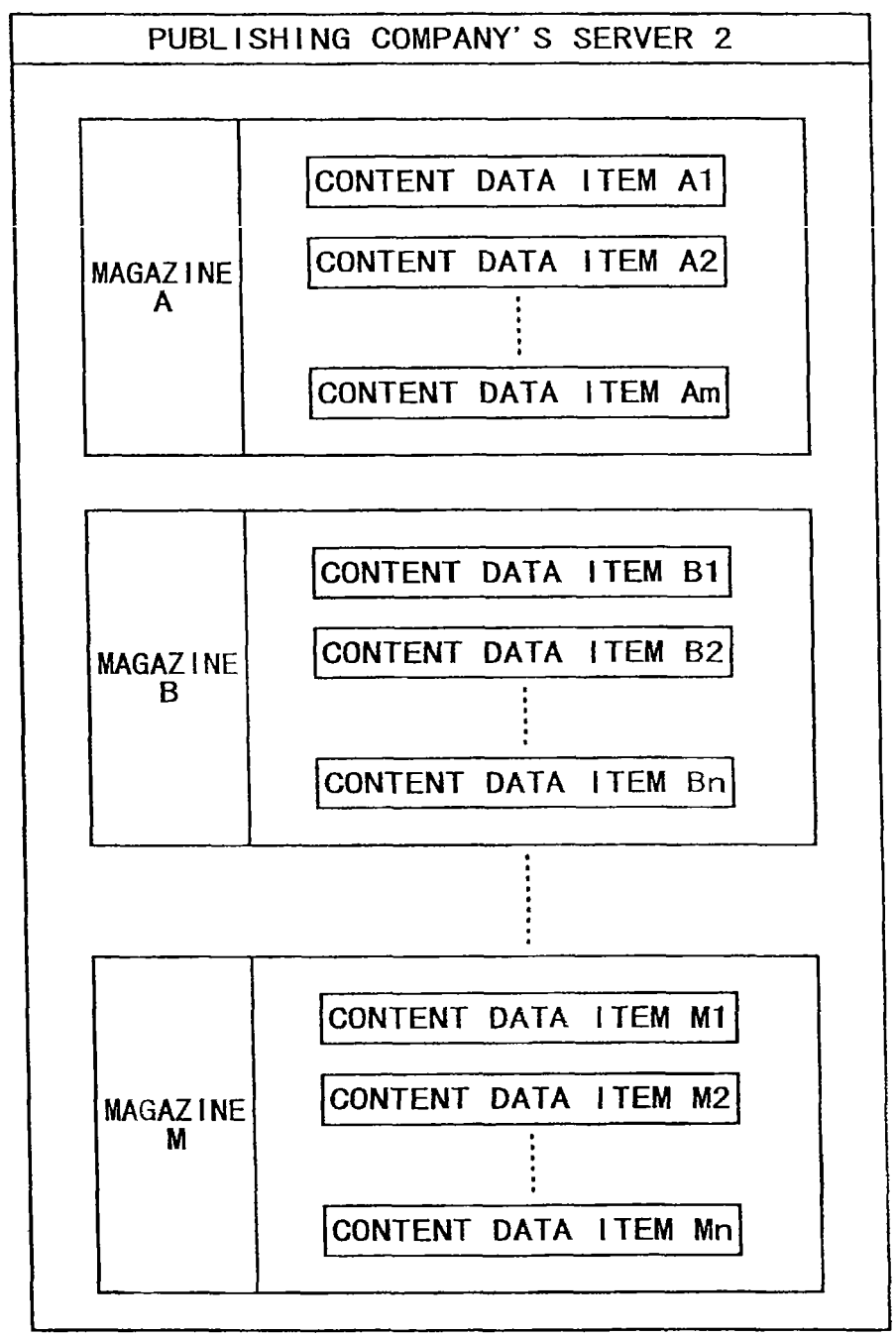
FIG. 6 is an explanatory view of content data.

Each of the magazines published by the publishing company 2 contains a plurality of articles. Each of these articles is called a content data item. For example, a magazine A shown in FIG. 6 is composed of content data items A1 through Am (m=natural number). A magazine B is constituted likewise by content data items B1 through Bn (n=natural number and may be equal to "m").

If the magazine A is in fact a periodical or a newspaper, each of the content data items A1 through Am constitutes an article; if the magazine A is in fact a novel, the content data items A1 through Am constitute a chapter each. If the magazine A actually makes up a novel and if the novel is in serial form spanning, for example, 10 volumes, then each content data item A may correspond to one volume of data. The magazine A as a whole is constituted by the 10 volumes of data.

As described, a content data item forms a data unit much smaller than a single conventional paper book. The user can obtain content data in units of content data items by carrying out steps to be described later. Conventionally, the user had to purchase an entire magazine just to read a desired article contained therein. According to this invention, by contrast, the user can purchase only a preferred article out of a relevant magazine.

Returning to step S11 in the flowchart of FIG. 5, the publishing company's server 2 creates a content data item as described above by referring to FIG. 6. In step S12, an ID for uniquely identifying the created content data item is attached to the data. Illustratively, each content data item is structured as shown in FIG. 7 when furnished with its ID.

The ID includes at least a magazine identifier 131 for identifying the magazine and a content data identifier 132 for identifying the content data item in question. An identifier for identifying the publishing company may also be included in the ID. In this case, a publishing company identifier may be included in the magazine identifier 131. The magazine identifier 131 and content data identifier 132 may be formed as a single ID as long as it can uniquely identify each content data item.

Aside from its ID, the content data item includes a title 133, a genre name 134, and a content data body 135. The title 133 briefly represents what is contained in the content data item. The genre 134 denotes the category to which the content data item belongs. The content data body 135 is self-explanatory; it is the body of the content data item in question. The content data structure shown in FIG. 7 is only an example; it may include other information and data as well.

Furnished with its ID in step S12, the content data item structured as depicted in FIG. 7 is transmitted to the control server 3 in step S13. In step S21, the control server 3 receives the content data item from the publishing company's server. The received content data item is placed as content data 112 into the storage unit 58 of the control server 3.

The processing above is repeated for each content data item with each publishing company's server 2. As a result, the storage unit 58 of the control server 3 accommodates a plurality of content data items received from a plurality of publishing companies.

Figure 8:
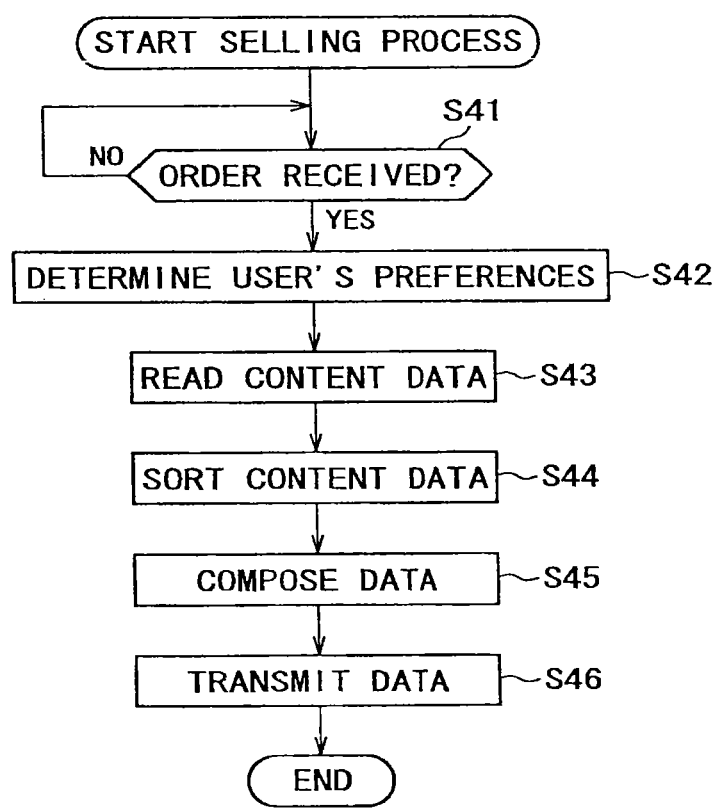
FIG. 8 is a flowchart of steps for selling an electronic book.

Described below with reference to the flowchart of FIG. 8 is how the content data 113 held in the storage unit 58 are transmitted to a user in response to an order placed by that user. The processing in FIG. 8 is carried out by the control server 3. In step S41, the order accepting part 101 of the control server 3 determines whether an order for the purchase of an electronic book is placed by an user.

Step S41 is repeated until such an order is found to be placed by the user. Given the order, the order accepting part 101 admits user information and information for identifying the ordered electronic book (i.e., electronic book identification information). The order accepting part 101 supplies the input user information to the preference determining part 102 and sends the electronic book identification information to the selecting part 103.

In step S42, the preference determining part 102 determines the preferences of the user who has placed the order on the basis of the supplied user information. Upon determining the user preferences, the preference determining part 102 refers to the preference data 111 held in the storage unit 58. The preference data 111 are structured illustratively as shown in FIG. 9. The preference data 111 are constituted by user names for identifying the individual users and by corresponding genre names.

A plurality of genres are established as shown in FIG. 9, including "politics," "economy," "society," "sports" and "entertainment." Where each user name intersects with each genre name, there is recorded a number that represents the number of times the user in question has selected (i.e., placed an order for) the genre so far. These order counts are used as a basis for managing and determining the user preferences.

The genres that have attracted large numbers of orders from the users are interpreted as reflecting their preferences. That is, the number of orders placed per genre can be used as a basis for determining each user's preferences, whereby the preference data 111 are created. Detailed steps for creating the preference data 111 will be discussed later.

In step S42, the preference determining part 102 first identifies the user name based on the supplied user information and then retrieves from the preference data 111 those data corresponding to the identified user name. With the preference data retrieved, the genres favored by the user are sorted in the descending sequence of the order counts associated therewith. This permits determination of the preferences of the user who has placed the order.

If no user name can be identified, then the user is treated as a newcomer whose name is registered for the preference data ill. Any orders that may be placed from now on by that new user are accumulated as the preference data regarding the user in question. How to create the preference data 111 will be described later with reference to the flowchart of FIG. 13.

After the user preferences are determined in step S42, the selecting part 103 goes to step S43 to read content data. From the order accepting part 101, the selecting part 103 is given the electronic book identification information for identifying the content data ordered by the user. Based on the electronic book identification information, the selecting part 103 reads the corresponding content from the content data 112 stored in the storage unit 58.

The content data items held in the storage unit 58 are each structured as shown in FIG. 7. Each of the content data items thus structured is uniquely identified and retrieved by having the corresponding magazine identifier 131 and content data identifier 132 supplied as the electronic book identification information.

In step S43, the content data read by the selecting part 103 are fed to the sorting part 104. The sorting part 104 is also supplied with information made of the user preferences determined by the preference determining part 102 in step S42. In step S44, the sorting part 104 sorts the input content data on the basis of the user preference information supplied concurrently. The processing up to the sorting step is described below in more detail with reference to FIGS. 10 and 11.

How the selecting part 103 selects content data will now be described by referring to FIG. 10. Suppose that the input electronic book identification information says the user has placed an order for five content data items: content data items A1 and A5 from the magazine A, a content data item B2 from the magazine B, and content data items C10 and C15 from the magazine C. These content data items are then retrieved from the content data 111 in the storage unit 58.

That is, this embodiment allows content data to be retrieved not in units of magazines but in increments of content data items constituting the magazines. The user is thus offered content data on an item by item basis.

How the sorting part 104 sorts content data items will now be described by referring to FIG. 11. As discussed above with reference to FIG. 10, the content data items retrieved by the selecting part 103 are supplied to the sorting part 104. Of the supplied content data, the content data item A1 belongs to the genre of economy, item A5 to politics, item B2 to entertainment, item C10 to economy, and item C15 to sports, as shown in FIG. 11.

From the preference determining part 102, the sorting part 104 is given the user preference data indicating the preferred genres topped by economy, followed by entertainment, society, sports, politics, etc., in that order, as depicted in FIG. 11. The content data items are sorted in accordance with these user preference data. In FIG. 11, the content data items are shown unsorted on the left-hand side and sorted on the right-hand side. The preference data serve as a kind of filter. Passed through the filter, the unsorted content data items are sorted into a sequence preferred by the user.

Referring to FIG. 11, the content data associated with economy, i.e., the most preferred genre, are sorted to come at the top. Specifically, the content data items A1 and C10 belong to the genre of economy and are arranged into the highest-priority place.

The content data associated with entertainment, i.e., the second-preferred genre, are then sorted into the place following the content data item C10. Only the content data item B2 belongs to the genre of entertainment, and the item is placed just below the content data item C10. The content data associated with society, i.e., the third-preferred genre, are sorted next into the place following the content data item B2. Since no content data item associated with society has been retrieved from the storage unit 58, no sorting takes place at this point.

The content data associated with sports, i.e., the fourth-preferred genre, are sorted next into the place following the content data item B2. Only the content data item C15 belongs to the genre of sports, and the item is placed just below the content data item B2. The content data associated with politics, i.e., the fifth-preferred genre, are then sorted into the place following the content data item C15. Only the content data item A5 belongs to the genre of politics, and the item is placed just below the content data item C15. These steps are carried out repeatedly on all retrieved content data items.

After the processing above, step S45 of FIG. 8 is reached for a composing process. This process requires that a plurality of sorted content data items be composed into a single electronic book to be offered to the user. As shown in FIG. 12, the composition more specifically involves putting together the sorted content data items into a single body furnished with a cover 141.

The cover 141 carries such information as the date of purchase and the title of a novel or a magazine. A single or a plurality of items of such information may be carried by the cover.

After the content data items are composed into a single electronic book in step S45, step S46 is reached. In step S46, the electronic book is transmitted to the user terminal 4 from which the user placed the purchase order earlier.

Figure 13:
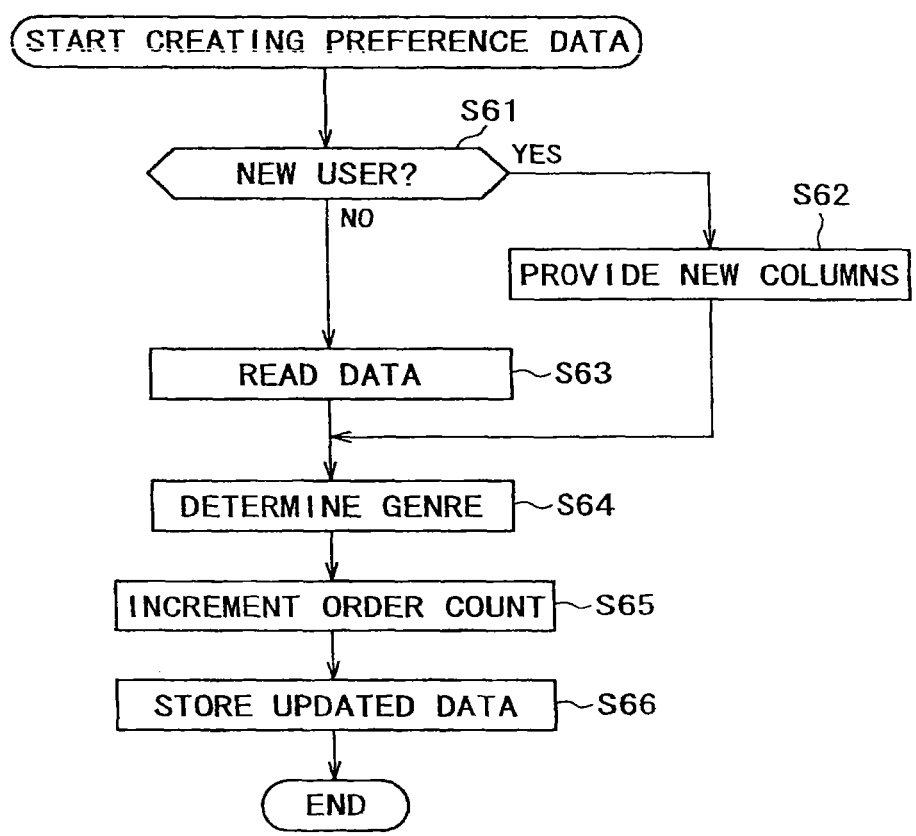
FIG. 13 is a flowchart of steps for creating preference data.

How the preference data 112 (FIG. 9) are created will now be described with reference to the flowchart of FIG. 13. The preference data 112 are used as a basis for sorting content data items into a sequence preferred by the user before the sorted items are sent as an electronic book to the user. The steps in FIG. 13 are carried out by the preference determining part 102 when a purchase order is placed by the user.

An order placed by the user causes the order accepting part 101 to supply user information to the preference determining part 102 as mentioned above. Given the user information, the preference determining part 102 identifies the user who has placed the order and determines in step S61 whether the information constituting the user's preferences is stored as part of the preference data 111 in the storage unit 58. What takes place in step S61 is the same as the process of determining whether the user who has placed the order is a newcomer.

If it is determined in step S61 that the user is a newcomer, step S62 is reached. In step S62, additional columns are provided in which to store preference data about the user who is found to be a new user (i.e., columns for accommodating a user name and order counts for the preferred genres, as shown in FIG. 9). The information to be acquired in step S64 and subsequent steps will be recorded to the newly furnished columns.

If it is determined in step S61 that the user is not a newcomer, that means the preference data about the user who has placed the order already exist in the storage unit 58. In that case, the corresponding preference data regarding each of the genres involved are retrieved from the storage unit 58 in step S63.

In step S64, the preference determining part 102 determines the genre to which the content data item ordered by the user belongs. The determination of the genre is accomplished on the basis of the information supplied by the selecting part 103. Earlier, the selecting part 103 received electronic book identification information from the order accepting part 101. Based on the received electronic book identification information, the selecting part 103 has retrieved from the storage unit 58 the content data item ordered by the user as part of an electronic book. The retrieved content data item includes a genre name 134 (FIG. 7) indicating the genre with which the content data item in question is associated.

The information about the genre 134 is sent from the selecting part 103 to the preference determining part 102. In turn, the preference determining part 102 determines the genre of the content data item ordered by the user. With the genre determined, step S65 is reached in which an order count is incremented by one for the genre of the data item read in step S63. If step S64 and subsequent steps have been preceded by step S62, the same process above is performed with all retrieved data regarded as zero.

In this manner, the order count for the genre of the content data item ordered by the user is updated to reflect the number of times an order has been placed for the genre so far. After all content data items ordered by the user have been subjected to the same steps above, the updated order counts for the preferred genres are stored into the storage unit 58 as preference data ill in step S66.

The preference data 111 thus created and placed into the storage unit 58 are used illustratively during the sorting process as discussed above. The preference data 111 may be created illustratively in parallel with step S44 and subsequent steps being carried out as indicated in the flowchart of FIG. 8.

The embodiment above was shown creating the preference data 111 on the basis of what has been ordered by each user so far. However, this is not limitative of the invention. Alternatively, users may have their preferences registered in advance. As described above, the preference data 111 are categorized in a plurality of genres. Users may enter their preferences to establish a desired sequence of the predetermined genres. The preference data thus established are then utilized in the manner discussed above.

The foregoing embodiment was shown determining what has been ordered by each user and how many times the order has been placed by the user so far for each of predetermined genres, the accumulated order counts being used as a basis for determining the user's preferences. However, this is not limitative of the invention. Instead of utilizing the accumulated order counts unmodified, a variation of the invention may numerically rank the genres according to their accumulated order count (e.g., assigning 1 to the genre with the highest accumulated order count, 2 to the genre with the second-highest accumulated order count, etc.) for sequence management purposes. As another alternative, the genres thus ranked may be weighted in a suitable manner before use.

When the content data items in the electronic book destined for the user are sorted to reflect the user's preferences, these items are easy for the user to read. What follows is a description of how content data are typically displayed on the user's terminal 4 after the electronic book has been transmitted to the terminal 4 following step S46 at the end of the flowchart in FIG. 8.

Figure 14:
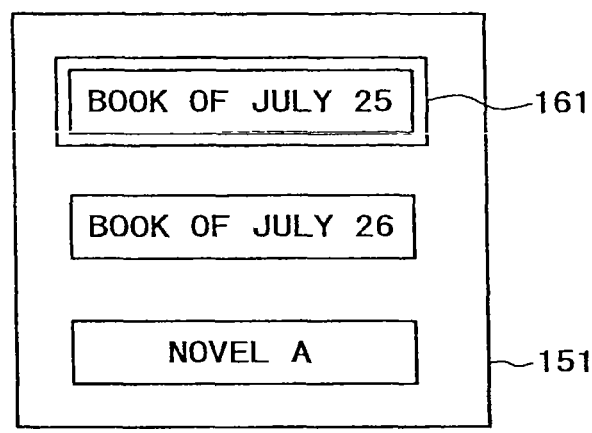
FIG. 14 is a schematic view of a typical screen on display.

FIG. 14 is a typical screen that appears on a display 151 (displaying means) of the user's terminal 4. In the example of FIG. 14, the display 151 shows three items: "Book of July 25," "Book of July 26," and "Novel A." The displayed items make up the data carried by the cover 141 (in FIG. 12). Where the cover 141 illustratively carries the data constituting the items such as "Book of July 25," that cover 141 is considered typically representative of newspaper articles or stories from a plurality of magazines.

A cursor 161 also appears on the display 151. The cursor 161 can be moved from one desired item to another by the user manipulating a suitable pointing device (not shown). When the user points the cursor 161 to a desired item to check its content and performs an operation to finalize the selection, the display 151 is switched over to presenting the content of the selected item.

Figure 15:
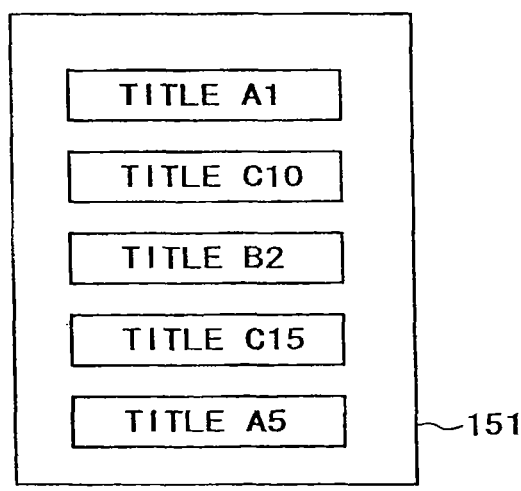
FIG. 15 is a schematic view of another typical screen on display.

FIG. 15 shows a display 151 with its screen switched over to a presentation different from what is shown in FIG. 14. The example of FIG. 15 indicates that an electronic book made up of the content data items shown in FIG. 12 is being selected. Each of the content data items includes title data constituting a title 133 (see FIG. 7) representative of what is contained in the item.

A text based on the data covered by each title 133 is made to appear on the display 151 as shown in FIG. 15. Illustratively, the title named "title A1" in text corresponds to the "content data item A1," "title C10" to the "content data item C10," "title B2" to the "content data item B2," "title C15" to the "content data item C15," and "title A5" to the "content data item A5."

On the display, the titles are shown sorted to reflect the user's preferences. The user can simply check the preferentially sequenced titles for content from the top down; there is no need to pick each of randomly sequenced titles for confirmation of their contents. With this inventive system, the user can quickly get down to reading the preferred article in an electronic book without the tiresome chores of picking and choosing titles.

The user selects one of the displayed titles to check its content. In turn, the display 151 is switched to presenting the content of the selected title. Where the user's terminal 4 has only one screen, the whole display of the screen is switched.

If the terminal is equipped with two screens, one screen may display the titles while the other screen may indicate the content of the selected title.

The content indicated on the screen is made up of the data held in the content data body 135 (FIG. 7). The content data body 135 may be formed either by content data themselves or by data in different formats. If the content data body 135 is composed of content data themselves, these data are displayed as they are on the screen. Alternatively, the content data body 135 may be constituted by data in a different format, such as a URL (uniform resource locator).

If a URL is stored in the content data body 135, an operation to read the data body 135 causes the stored URL to be retrieved and accessed so that relevant data will be downloaded from the computer identified by that URL. The downloaded data are then displayed as representative of the content data body 135. Where URLs are used to make up the content data body 135, the capacity of a storage unit (not shown) required of the user's terminal 4 can be reduced.

With this embodiment, as described, the user can purchase only the desired content data and can dispense with all that is not needed. That was not the case in the past when the user had to buy a whole collection of unwanted articles and stories in addition to the one(s) actually desired. This can amount to a significant savings in the user's budget for electronic book purchases.

After a purchase order is placed by the user, the content data items making up the electronic book eventually offered to the user are sorted in a manner reflecting the user's preferences. Thus there is no need for the user to wade through the offered electronic book to find the desired content data items therein. The inventive system offers electronic books that are easier for the user to read than before.

In the above-described embodiment, the control center 3 was shown determining the user's preferences and sorting the content data items accordingly. Alternatively, the determining and sorting steps may be carried out by the user's terminal 4. That is, the control center 3 may simply compose a plurality of ordered content items into one electronic book (which may be handled as a single data unit) before sending the book to the user's terminal 4. Upon reproducing the electronic book thus received, the user's terminal 4 may sort the content data items and display their titles in a manner reflecting the user's preferences which are managed on the terminal side.

The series of steps described above may be executed by suitably functioning hardware or by software. For software-based processing to take place, programs constituting the processing sequences may be either loaded from dedicated hardware of a computer into its internal memory for execution, or installed upon program execution from a suitable program storage medium into a general-purpose personal computer or like equipment capable of executing diverse functions.

As shown illustratively in FIG. 2, the program storage medium is offered to the user apart from the personal computer (i.e., publishing company's server 2) not only as a package medium constituted by the magnetic disc 31 (including flexible discs), optical disc 32 (including CD-ROM (compact disc-read only memory) and DVD (digital versatile disc)), magneto-optical disc 33 (including MD (Mini-disc; registered trademark)), or semiconductor memory 34; but also in the form of the ROM 12 or the storage unit 18 such as a hard disc drive which contains the programs and which is incorporated beforehand in the computer.

In this specification, the steps which are stored on a program storage medium and which describe the programs to be executed represent not only the processes that are carried out in the depicted sequence (i.e., on a time series basis) but also processes that are conducted parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. A server comprising:
   circuitry programmed to:
   receive a request from an information processing apparatus, the request including a plurality of content data identifiers, each content data identifier corresponding to a content data item,
   extract each content data item from a corresponding content data file, the extraction being based on the content data identifier corresponding to the content data item,
   determine, for each extracted content data item, a genre of the content data item,
   compute a preference score for each determined genre, the preference score being computed based on a number of previously purchased content data items of the genre and a number of content data items of the genre included in the request,
   acquire a title of each extracted content data item,
   sort the acquired titles in an order based on the computed preference score of the genre of the content data items; and
   generate and transmit, a single document to be displayed on a display panel of the information processing apparatus, the generated single document including the acquired titles being displayed based on the sorted order of the titles.

2. The server according to claim 1, wherein the circuitry is further programmed to:
   transmit, to the information processing device, URLs (URL: Uniform Resource Locator) associated with the plurality of extracted content data items, and
   receive request to download content data of the extracted content data items based on the transmitted URLs.

3. The server according to claim 1, wherein the content data file is one of a book, magazine, and article.

4. The server according to claim 3, wherein the content data items are generated by dividing the content data file into a plurality of portions, each portion corresponding to a size of content data associated with the content data item.

5. The server according to claim 1, wherein the information processing apparatus is a PDA or an eBook.

6. The server according to claim 1, wherein the circuitry is further programmed to transmit to the information processing apparatus, information of the content data files from which content data items are extracted.

7. The server according to claim 6, wherein the information of the content data files includes at least titles of the content data files from which at least one content data item is extracted.

8. A method implemented by a server, the method comprising:
   receiving, via circuitry, a request from an information processing apparatus, the request including a plurality of content data identifiers, each content data identifier corresponding to a content data item;
extracting each content data item from a corresponding content data file, the extraction being based on the content data identifier corresponding to the content data item;
determining, for each extracted content data item, a genre of the content data item;
computing a preference score for each determined genre, the preference score being computed based on a number of previously purchased content data items of the genre and a number of content data items of the genre included in the request;
acquiring a title of each extracted content data item;
sorting by circuitry, the acquired titles in an order based on the computed preference score of the genre of the content data items; and
generating and transmitting by circuitry, a single document to be displayed on a display panel of the information processing apparatus, the generated single document including the acquired titles being displayed based on the sorted order of the titles.

9. The method according to claim 8, further comprising:
transmitting to the information processing device, URLs (URL: Uniform Resource Locator) associated with the plurality of extracted content data items; and
receiving request to download content data of the extracted content data items based on the transmitted URLs.

10. The method according to claim 8, wherein the content data file is one of a book, magazine, and article.

11. The method according to claim 10, further comprising:
generating content data items by dividing the content data file into a plurality of portions, each portion corresponding to a size of content data associated with the content data item.

12. The method according to claim 8, wherein the information processing apparatus is a PDA or an eBook.

13. The method according to claim 8, further comprising:
transmitting by circuitry, to the information processing apparatus, information of the content data files from which content data items are extracted.

14. A non-transitory computer-readable medium having computer-readable instructions thereon which when executed by a computer cause the computer to implement a method, comprising:
receiving a request from an information processing apparatus, the request including a plurality of content data identifiers, each content data identifier corresponding to a content data item;
extracting, each content data item from a corresponding content data file, the extraction being based on the content data identifier corresponding to the content data item;
determining, for each extracted content data item, a genre of the content data item;
computing a preference score for each determined genre, the preference score being computed based on a number of previously purchased content data items of the genre and a number of content data items of the genre included in the request;
acquiring a title of each extracted content data item;
sorting by circuitry, the acquired titles in an order based on the computed preference score of the genre of the content data items; and
generating and transmitting by circuitry, a single document to be displayed on a display panel of the information processing apparatus, the generated single document including the acquired titles being displayed based on the sorted order of the titles.

15. The non-transitory computer-readable medium according to claim 14, the medium having computer-readable instructions stored thereon which when executed by a computer cause the computer to implement a method further comprising:
transmitting to the information processing device, URLs (URL: Uniform Resource Locator) associated with the plurality of extracted content data items; and
receiving request to download content data of the extracted content data items based on the transmitted URLs.

* * * * *